United States Statutory Invention Registration [19]

[11] Reg. Number: H556

Tarko

[43] Published: Dec. 6, 1988

[54] METHOD OF MANUFACTURE AND MACHINE FOR MANUFACTURING SUBTERRANEAN WALL DRAIN

[76] Inventor: Paul L. Tarko, 383 S. Main St., Windsor Locks, Conn. 06096

[21] Appl. No.: 803,340

[22] Filed: Dec. 2, 1985

[51] Int. Cl.[4] ..... B27G 11/02; B31F 5/04; B31F 1/20; B32B 31/24

[52] U.S. Cl. ..... 156/379.8; 156/350.9; 156/462; 156/470; 156/474; 156/500; 156/510; 425/369; 425/396

[58] Field of Search ..... 156/205, 210, 470, 472, 156/474, 462, 379.6, 379.8, 380.9, 275.1, 308.4, 500, 510, 290–291, 359, 360; 425/369, 396; 405/45, 49; 52/169.5, 799

[56] References Cited

U.S. PATENT DOCUMENTS

| | | | |
|---|---|---|---|
| 3,002,873 | 10/1961 | Pickren | 156/205 |
| 3,024,496 | 3/1962 | Colombo | 425/396 |
| 3,025,963 | 3/1962 | Bauer | 156/205 |
| 3,563,038 | 2/1971 | Healy | 210/486 |
| 3,616,077 | 10/1971 | Jessee | 156/205 |
| 3,676,247 | 7/1972 | Morris | 156/205 |
| 3,826,701 | 7/1974 | Miller | 156/360 |

*Primary Examiner*—John F. Terapane
*Assistant Examiner*—J. E. Thomas
*Attorney, Agent, or Firm*—Fishman & Dionne

[57] ABSTRACT

A continuous method of manufacturing a drainage system and apparatus therefore comprises a continuous assembly line which forms a plastic core material followed by continuously forming an envelope surrounding the formed plastic core and then sealing the stuffed envelope. In a preferred embodiment of the present invention, an extruder is used to transform granulated plastic material into sheet form. This plastic sheet is then fed directly into a plastic forming machine. The plastic forming machine will form a plurality of hills and valleys in the plastic sheet thereby defining a plastic core. Thereafter, continuous sheets of permeable fabric material are attached to the upper and lower surfaces of the formed core while the edges of the permeable fabric are secured to one another either by adhesive, sewing or any other suitable bonding method. Next, the draining system is either cut into desired lengths or rolled for shipping purposes.

15 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MANUFACTURE AND MACHINE FOR MANUFACTURING SUBTERRANEAN WALL DRAIN

BACKGROUND OF THE INVENTION

This invention relates generally to a method and apparatus for constructing a drainage device or system for use in removing water either on a hillside, in the vicinity of foundations or the like, or in filtration systems.

In order to maintain basement interiors dry and moisture free, it is necessary to remove water penetrating the soil mass adjacent the subterranean walls quickly, while avoiding a decrease in the strength of the soil "piping" or pore pressure. Such removal is often accomplished by means of drainage systems comprising drainage pipes surrounded by a mineral aggregate. The particle size distribution of the aggregate must be carefully matched to the native soil in the region of construction. The functions of a properly designed drainage system are to remove water from the surrounding soil while "filtering" preventing movement of soil particles therefrom. Many of the prior art drainage systems as discussed hereinabove suffer from significant deficiencies and disadvantages caused by clogging or other malfunctioning.

U.S. Pat. Nos. 3,563,038, 3,654,765 and 4,490,072 (all three prior patents being fully incorporated herein by reference) overcome the significant problems of prior art drainage systems by disclosing drainage devices of the type which include a drainage pipe provided below a core surrounded by a ground water pervious material to provide a pathway for the water through the core into the drainage pipe. The drainage device disclosed in these three patents are well known by the terms subterranean wall drain, drainage system or composite curtain drain. Drainage systems of this type are commercially marketed by the ELJEN CORPORATION of Storrs, Conn. Typically, this drainage system comprises an envelope of a nonwoven filter material having a core which leads to a pipe inside the water pervious nonwoven material. This core comprises a plastic sheet having a plurality of alternate valleys and raised portions defined in the sheet. Preferably, this core leads to a slotted pipe. During use, water enters the pervious envelope material, flows downwardly along the corrugated hills and valleys of the plastic core material and then enters into the slotted pipe to be carried away from the hillside, foundation or filtration system. Thus, as so constructed, the drainage device of the prior patents are well adapted to handle the downward flow of water beneath the surface of the ground in a drainage system or a septic system filter such that normal hydrostatic pressure will force this water inwardly through the water permeable filter material and into the valleys defined in the core where gravity carries the water downwardly to the drainage pipe and more particularly to the slotted openings in the drainage pipe.

Previously, several different methods and devices have been used to produce the drainage system described in the above cited patents. Significantly, all of these methods for producing the drainage system relate to a continuous process for producing only the plastic core (containing the hills and valleys). It will be appreciated that subsequent to the production of the core, the water permeable fabric is cut and sewn into a cloth envelope whereupon the core and slotted pipe is inserted therein either at the plant or on the job site. Two distinct types of methods have been used in forming the core. One method involves the use of a vacuum forming machine which consists of a flat steel mold for producing the desired shape with small holes where a vacuum is applied. It will be appreciated that the vacuum pulls down the plastic sheet to the mold surface to form the desired bumps and valleys. This vacuum forming-type device also includes a heat chamber where the plastic is heated prior to being pulled over the forming die. A second method of forming the plastic core is by using a pressure forming machine which also utilizes a heat chamber where plastic is heated and softened and then pulled over or through a die set whereupon the hills and valleys are formed between two die surface. These surfaces are matched dies which can be either flat or in the form of rollers.

Such a pressure forming machine as described above has been used by Trans World Consulting Co. Inc. of Windsor Locks, Conn., and comprises a heat chamber where preferably radiant heaters are applied to soften a continuous plastic sheet. Other types of heaters or heating units such as infrared, wire, cartridge, microwave, gas, or the like could also be used in the heat chamber to heat the plastic. In this pressure forming machine, two pressure forming rolls have been applied to form the "butts" i.e., raised hills or valleys into the previously heated and softened plastic sheet. The pressure forming rolls consist of a pair of mandrels having round pins of approximately 1½ inches which are pressed or threaded into each mandrel. Of course, any shape pin may be used to form the hills and valleys such as a square, hex, octagonal or any other shape so long as the plastic core material is provided with a corrugated, uneven surface having raised portions and lower portions.

While suited for its intended purposes, the apparatus and method of making the drainage system of the aforementioned patents suffers from several inefficiencies and drawbacks. For example, as mentioned, while the plastic core is being formed by the pressure forming machine, the water permeable fabric must be cut and sewn to form an envelope which will receive the core material. Thereafter, after the core has been stuffed into the envelope, further sewing steps may be needed to enclose the core. The necessity for prefabricating the cloth envelope along with the subsequent labor steps of stuffing the core material into the envelope is labor intensive, expensive and time consuming. Moreover, from a practical manufacturing standpoint, the separate labor steps needed to prefabricate and stuff the envelope dramatically decreases the daily output of the drainage system thereby adding to costs and limiting sales.

SUMMARY OF THE INVENTION

The above-discussed and other drawbacks and deficiencies of the prior art are overcome or alleviated by the apparatus and method for the continuous manufacture of a subterranean wall drain of the type disclosed in U.S. Pat. Nos. 3,563,038, 3,654,765 and 4,490,072. In accordance with the present invention, a continuous method of manufacturing a drainage system comprises a continuous assembly line which forms the plastic core material followed by continuously forming an envelope surrounding the formed plastic core and then sealing the stuffed envelope.

In a preferred embodiment of the present invention, an extruder is used to transform granulated plastic material into sheet form. This plastic sheet is then fed directly into a plastic forming machine such as a plastic machine described above and found in the prior art. The plastic forming machine will form a plurality of hills and valleys in the plastic sheet thereby defining a plastic core. Thereafter, continuous sheets of permeable fabric material are attached to the upper and lower surfaces of the formed core while the edges of the permeable fabric are secured to one another either by adhesive, sewing or any other suitable bonding method. Next, the draining system is either cut into desired lengths or rolled for shipping purposes.

The apparatus and method of the present invention precludes the necessity for prefabrication of a cloth envelope and the subsequent stuffing and sewing operations utilizing the formed core. Accordingly, the present invention affords decreased labor times and great cost savings and efficiencies.

The above-discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
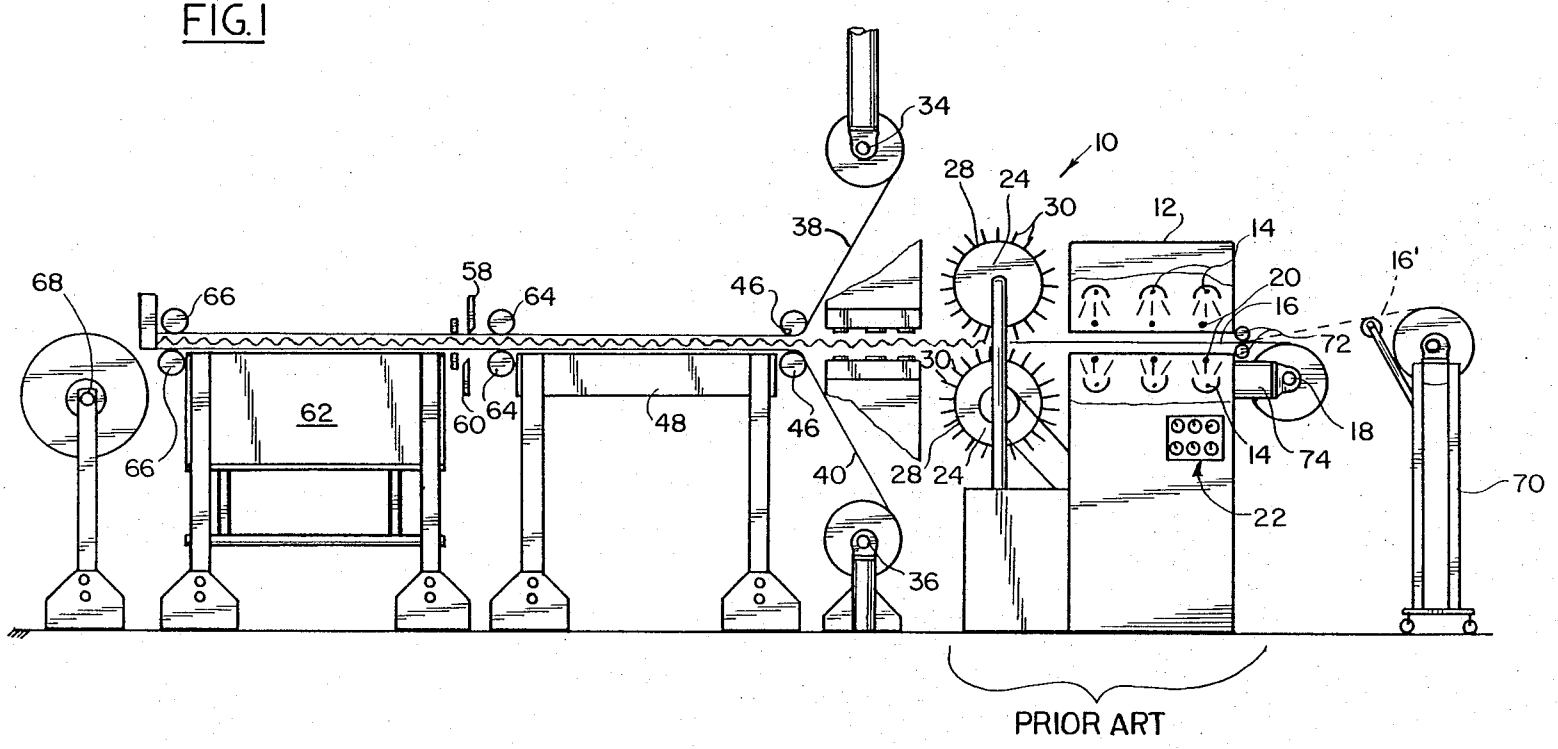
FIG. 1 is a side elevation view of an apparatus for the continuous manufacture of a subterranean wall drain system in accordance with the present invention.

Referring jointly to FIGS. 1 and 3–6, an apparatus for manufacturing a subterranean drain system as disclosed in U.S. Pat. Nos. 3,563,038, 3,654,765 and 4,490,072 is shown generally at 10 in FIG. 1. Apparatus 10 includes a heat chamber 12 which may be mounted vertically or horizontally on a stand or frame 14. Heat chamber 12 includes a plurality of preferably radiant heaters 14 which act to heat and soften plastic sheet 16 (so as to make the plastic sheet 16 pliable or formable); the plastic sheet 16 having been fed therethrough from a location on roller 18 (see step A in FIG. 6). It will be appreciated that heat chamber 12 may house any adequate source of heat other than radiant heaters including infrared, wire, microwave, gas heaters or the like. Preferably, a sensor device such as thermocouples 20 are located within heat chamber 12 and which act to sense desired temperatures within the heat chamber. These temperature sensors or thermocouples 20 are electrically connected to the heat control instrument panel shown generally at 22. Heat control panel 22 is well known and may consist of known commercially available electric or electronic control systems. Due to slight variation in the thickness of the sheet stock being fed to heat chamber 12, the apparatus of the present invention includes a known thickness or gauge control device which is associated with heat chamber 12. Thus, if the sheet stock 16 is thicker than usual, the gauge detectors will sense this difference and the heat chamber 12 will raise the temperature therein. Conversely, if the plastic sheet 16 is thinner than normal, the temperature will be correspondingly lowered.

Figure 3:
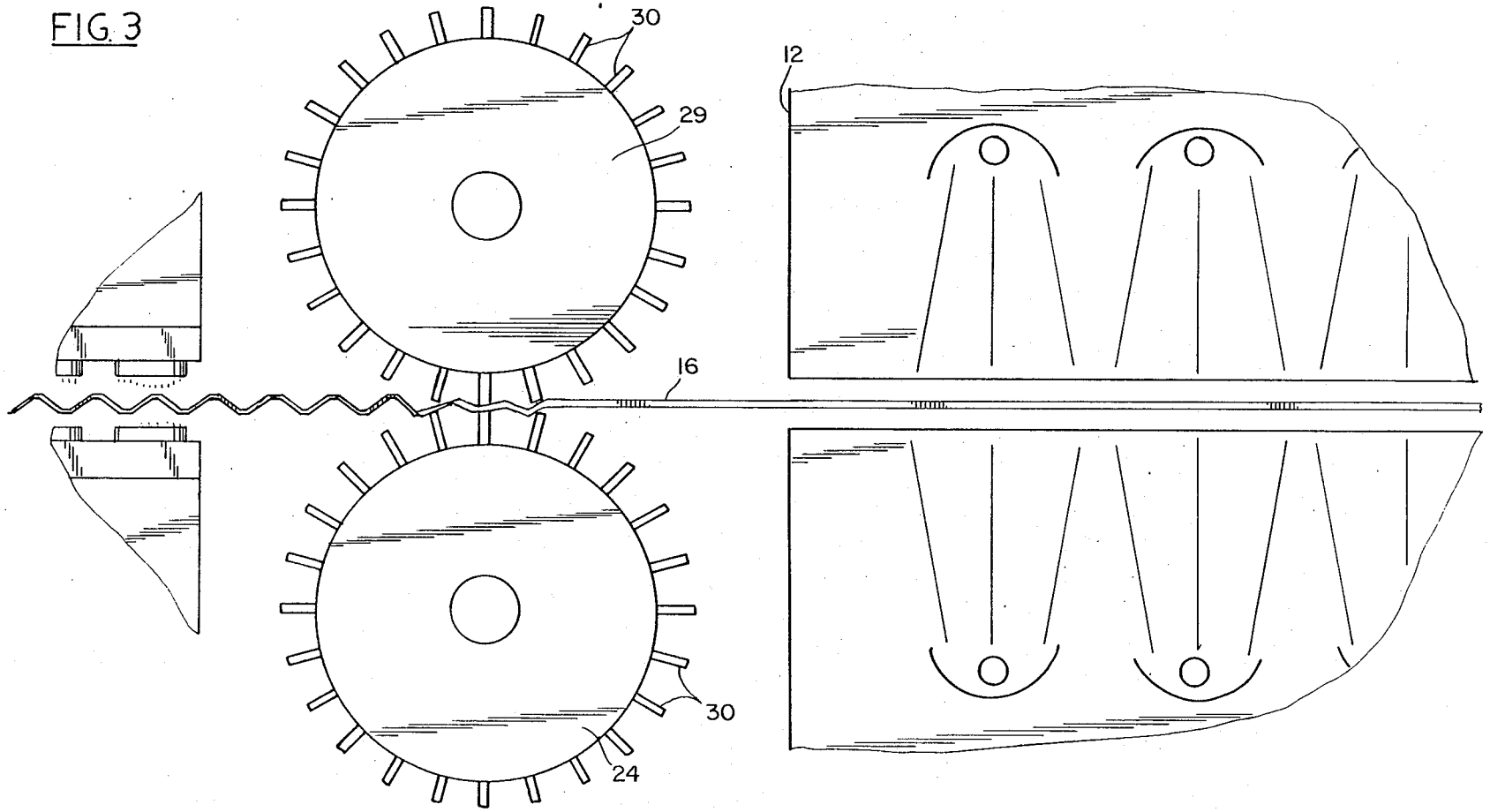
FIG. 3 is an enlarged side elevation view of a portion of the apparatus shown in FIG. 1.
Figure 4:
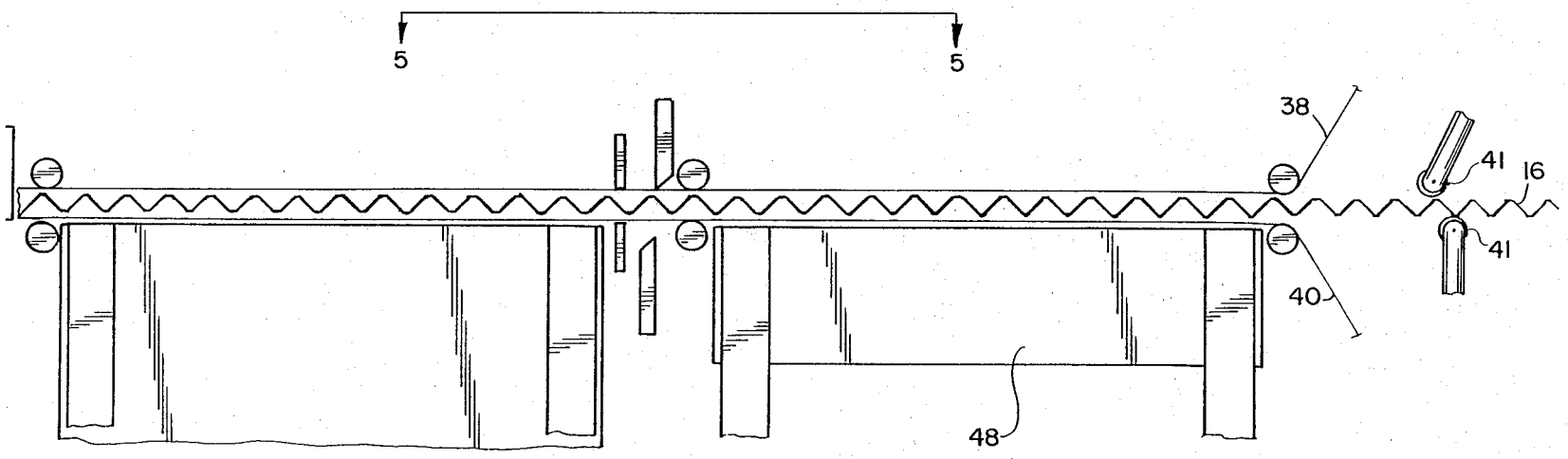
FIG. 4 is an enlarged side elevation view of another portion of the apparatus shown in FIG. 1.
Figure 6:
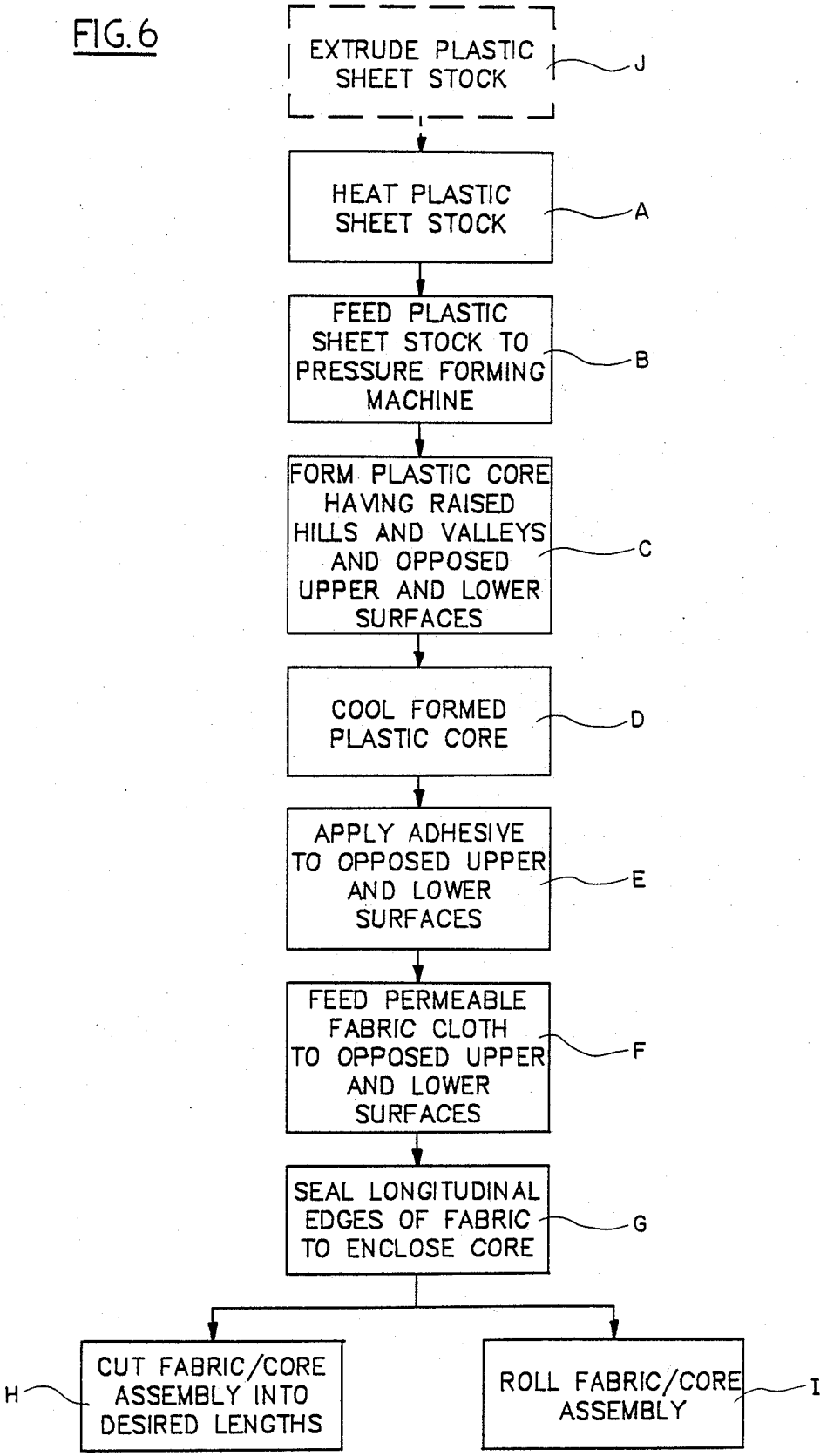
FIG. 6 is a block diagram outlining a method for manufacturing subterranean wall drain in accordance with the present invention.

After plastic sheet 16 has been heated and softened within heat chamber 12, sheet 16 is then fed through a pair of oppositely disposed pressure forming rollers identified generally at 24 and 24, (see step B in FIG. 6). Rollers 24 each comprise a metal cylinder or mandrel 28 having a plurality of spaced protrusions 30 extending therefrom. Protrusions 30 may have any desired shape such as round, square, hex, octagonal, irregular or any other shape so long as they are capable of creating hills and channel or valleys within softened plastic sheet 16. It will be appreciated that as the softened plastic sheet 16 passes between the two spaced pressure forming rolls 24, protrusions 30 from each roll 24 contact the pliable plastic sheet 16 exerting pressure thereagainst whereupon the hills and valleys corresponding to the shape of the protrusions are formed (see step C). In an alternative embodiment, only one of the rolls includes protrusions extending therefrom. As shown in FIGS. 1 and 3, subsequent to contacting pressure forming rolls 24, plastic 16 has formed therein a plurality of hills and valleys which now define the core material used in the subterranean wall drain of the above discussed patents.

As discussed hereinabove, the just described subassembly consisting of a plastic sheet feeding roller 18, heat chamber 12 and spaced apart pressure forming rollers 24 has been previously used in the prior art to form the plastic core material used in the subterranean wall drains disclosed in the prior patents. Thereafter, this formed plastic core was stuffed into a prefabricated envelope which was then sewn or otherwise sealed. These subsequent manufacturing steps were both time consuming and labor intensive thereby adding to the overall cost and low efficiency of the prior art manufacturing method.

In accordance with the present invention, an improved method and apparatus is provided to the method and apparatus of the prior art which permits a continuous manufacturing of the subterranean wall drain. Referring back to FIG. 1, subsequent to the formed plastic core emerging from pressure forming rolls 24, the core 16 is passed through a cooling apparatus 32 so as to stiffen or harden core 16 (see step D). It will be appreciated that cooling apparatus may consist of a water, air or any other suitable cooling device. Next, rollers identified at 34 and 36 are positioned on opposed upper and lower surfaces of formed plastic core 16. Rollers 34 and 36 each are provided with continuous sheets of a water permeable fabric material, preferably a nonwoven filter material. This water permeable fabric 38 and 40 are delivered to the upper and lower surfaces of core 16 by a pair of transfer rollers 46 whereupon the fabric 38 and 40 respectively contacts the opposed surfaces of core 16 (see step E). Preferably, fabric 38 and 40 may have adhesive applied thereto which will contact the formed core 16 and form an adhesive bond thereagainst (see step F). Such adhesive may be continuously applied subsequent to cooling using any suitable device such as knife rollers 41 shown in FIG. 4. Also, the adhesive is preferably applied only to the raised portions of core 16 since only the raised portions of the core contact the permeably fabric 38 and 40.

After fabric 38 and 40 has been applied to core 16, the fabric/core assembly is delivered to a sealing table 48 whereupon the longitudinal edges 50, 52 of fabric layers 38 and 40 are sealed by any suitable means including, but not limited to sewing, glueing, heat sealing, ultrasonic, and stapling (see step G). Such sealing means are shown generally at 54 and 56 in FIG. 5. Oppositely disposed sealing means 54 and 56 may be adapted for sewing, glueing, heat sealing or any other suitable sealing method. Thus, the fabric/core assembly is run between oppositely disposed sealing devices 54 and 56 whereupon the longitudinal edges 50 and 52 are sewn or otherwise sealed.

Figure 5:
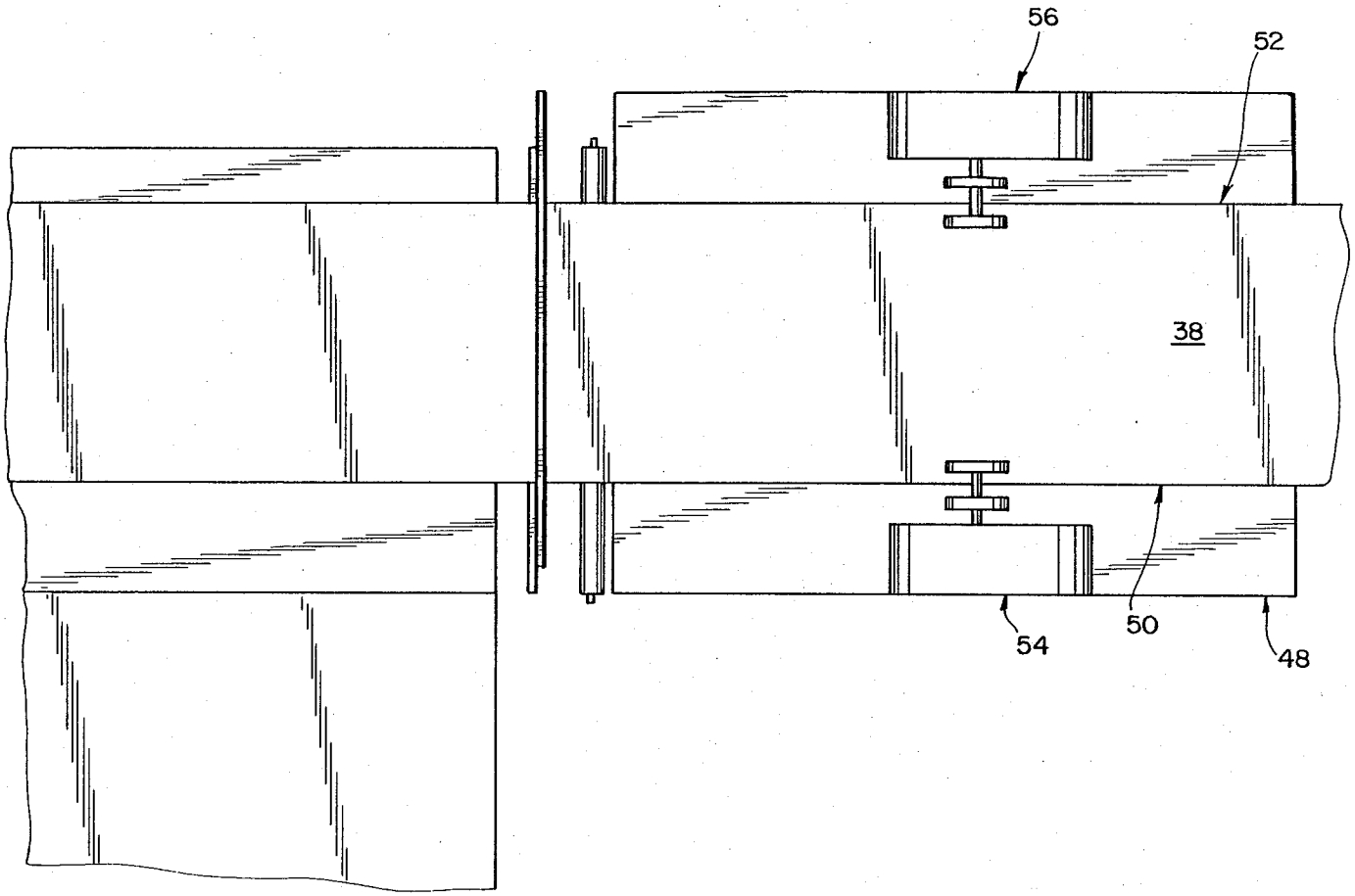
FIG. 5 is a plan view taken along the line 5—5 in FIG. 4.

Subsequent to longitudinal edges 50 and 52 being sealed, sealed fabric/core assembly may be cut into desired lengths via the top and bottom cutting mechanism shown generally at 58 and 60 in FIGS. 1 and 5. After cutting into desired lengths, the sealed fabric/core assembly may be transferred to a storage area or boxed for shipping using a conveyor system shown generally at 62 which will remove the cut product at, for example, right angles from the main conveyor line. Alternately, transfer rollers 64 and 66 may simply deliver the fabric/core assembly to a roller 68 whereupon the product will be rolled into continuous lengths for shipping. It will be appreciated that the slotted piping which is used in conjunction with the fabric/core assembly may be added to the product subsequent to shipping at the installation location.

As discussed earlier, plastic sheet 16 is unrolled from a continuous roller 18 and fed through heat chamber 12 to begin the process in accordance with the present invention. It will be appreciated that when a roll of plastic sheet 16 is almost completed from roll 18, a second roll of plastic sheet 16' which is supported on moveable roll stand 70 is fed into transfer rollers 72 as shown in FIG. 1 whereupon the second roll of plastic sheet 16' is then fed into the heat chamber 12. Thereafter, this second roll of plastic sheet 16' may be simply lifted off moveable roll stand 70 and inserted on roll support 74 to replace the first roll 18. This method of replacing rolls may be repeated so as not to interrupt the continuous process of forming subterranean drain system as has been discussed hereinabove.

Figure 2:
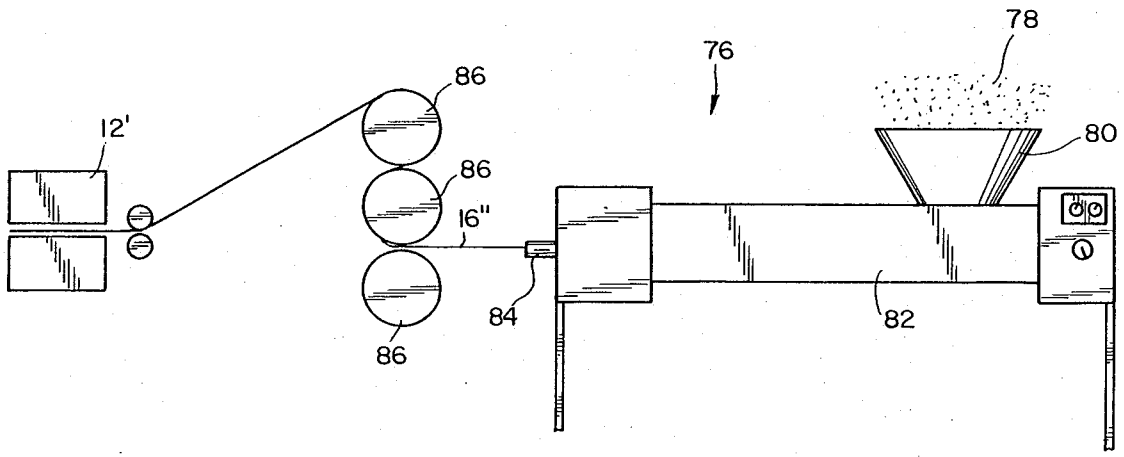
FIG. 2 is a side elevation view of a sheet feeding extruder which may be used in conjunction with the apparatus and method of the present invention.

Referring now to FIG. 2, in a preferred embodiment where it is desired to further decrease cost and increase the amount of subterranean drain system manufactured by the present invention, a well known extruding device as shown generally at 76 may be used to initially form the plastic sheet (see step J). When using an inline extrusion device 76, the raw material, which generally consists of plastic granules 78 are fed into the extruder's hopper 80 whereupon the plastic is delivered to a heated cylinder 82 and is melted. The plastic melt is then pushed through a sheeting dye 84 where the plastic is formed ihto a sheet 16''. From there, the plastic sheet 16'' is fed through a series of calendar rollers such as the three rollers 86 shown in FIG. 2. The calendar rollers press the formed plastic sheet 16' to a desired thickness. The plastic sheet 16' may be rolled up for later use or preferably, directly fed into heat chamber 12' in accordance with the above described process of the present invention. It will be appreciated that the use of plastic granules 78 as a starting material may be less expensive than purchasing preformed plastic sheet 16. However, in view of the relatively high cost of acquiring and running an extruder mechanism as shown in FIG. 2, the use of such an extruder to initially form the plastic sheet 16 would only be advisable for forming large quantities of the subterranean drain product.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for manufacturing subterranean drainage material comprising:

means for continuously delivering plastic sheet material to a heating means;

means for sensing the thickness of said plastic sheet material being delivered to said heating means;

means for increasing or decreasing the temperature in said heating means in accordance with said sensed thickness;

heating means for heating said plastic sheet material delivered from said delivery means;

means for forming a plurality of hills and valleys in said heated plastic sheet material to define a plastic core having opposed upper and lower surfaces;

means for cooling said formed plastic core;

means for continuously feeding permeable fabric cloth to said opposed upper and lower surfaces of said plastic core, the fabric cloth having opposed longitudinal edges; and means for sealing said opposed longitudinal edges of said fabric cloth to enclose said plastic core and define a sealed fabric/core assembly.

2. The apparatus of claim 1 including:

means for applying adhesive to said opposed upper and lower surfaces of said plastic core prior to feeding fabric cloth to said opposed surfaces.

3. The apparatus of claim 1 including:

means for extruding plastic sheet material; and means for delivering said extruded plastic sheet material to said heating means.

4. The apparatus of claim 1 including:

means for cutting said sealed fabric/core assembly into desired lengths.

5. The apparatus of claim 4 including:

means for conveying said cut fabric/core assembly to a different location.

6. The apparatus of claim 1 including:

means for rolling said sealed fabric/core assembly.

7. The apparatus of claim 1 wherein:

said plastic core is formed by delivering said heated plastic sheet between a pair of oppositely disposed mandrels, each mandrel having a plurality of selectively shaped protrusions extending therefrom.

8. The apparatus of claim 1 wherein:

said fabric cloth is located on two spaced rollers, each roller feeding fabric cloth to said upper or lower opposed surfaces of said core.

9. An apparatus for manufacturing subterranean drainage material comprising:

means for continuously delivering plastic sheet material to a heating means;

means for sensing the thickness of said plastic sheet material being delivered to said heating means;

means for increasing or decreasing the temperature in said heating means in accordance with said sensed thickness;

heating means for heating said plastic sheet material delivered from said delivery means;

means for forming a plurality of hills and valleys in said heated plastic sheet material to define a plastic core having opposed upper and lower surfaces;

means for cooling said formed plastic core;

means for applying adhesive to said opposed upper and lower surfaces of said plastic core wherein said upper and lower surfaces are at least partially covered with adhesive, said adhesive applying means precluding adhesive from filling in said valleys, said adhesive applying means being positioned on opposed surfaces of said core;

means for continuously feeding permeable fabric cloth to said adhesive covered opposed upper and lower surfaces of said plastic core, the fabric cloth having opposed longitudinal edges; and means for sealing said opposed longitudinal edges of said fabric cloth to enclose said plastic core and define a sealed fabric/core assembly.

10. The apparatus of claim 9 including:

means for extruding plastic sheet material; and means for delivering said extruded plastic sheet material to said heating means.

11. The apparatus of claim 9 including:

means for cutting said sealed fabric/core assembly into desired lengths.

12. The apparatus of claim 11 including:

means for conveying said cut fabric/core assembly to a different location.

13. The apparatus of claim 9 including:

means for rolling said sealed fabric/core assembly.

14. The apparatus of claim 9 wherein:

said plastic core is formed by delivering said heated plastic sheet between a pair of oppositely disposed mandrels, each mandrel having a plurality of selectively shaped protrusions extending therefrom.

15. The apparatus of claim 9 wherein:

said fabric cloth is located on two spaced rollers, each roller feeding fabric cloth to said upper or lower opposed surfaces.

* * * * *